United States Patent

Reiners et al.

[11] Patent Number: 5,885,474
[45] Date of Patent: Mar. 23, 1999

[54] USE OF POLYASPARTIC ACID AMIDES AS LEATHER AUXILIARY PRODUCTS

[75] Inventors: Jürgen Reiners; Manfred Schnee, both of Leverkusen; Torsten Groth, Odenthal; Winfried Joentgen, Köln; Gerd Schmitz; Harro Träubel, both of Leverkusen; Nikolaus Müller, Monheim, all of Germany

[73] Assignee: Bayer Aktiengesellschaft, Leverkusen, Germany

[21] Appl. No.: 11,241

[22] PCT Filed: Jul. 23, 1996

[86] PCT No.: PCT/EP96/03241

§ 371 Date: Jan. 28, 1998

§ 102(e) Date: Jan. 28, 1998

[87] PCT Pub. No.: WO97/06279

PCT Pub. Date: Feb. 20, 1997

[30] Foreign Application Priority Data

Aug. 4, 1995 [DE] Germany ............. 195 28 782.7

[51] Int. Cl.⁶ .................................................. C14C 9/00
[52] U.S. Cl. .................. 252/8.57; 8/94.21; 427/389; 428/540
[58] Field of Search ............... 252/8.57; 8/94.21; 427/389; 428/540

[56] References Cited

U.S. PATENT DOCUMENTS

| | | | |
|---|---|---|---|
| 3,846,380 | 11/1974 | Fujimoto et al. | 252/352 |
| 3,927,204 | 12/1975 | Neri et al. | 424/78 |
| 4,363,797 | 12/1982 | Jacquet et al. | 424/70 |
| 4,696,981 | 9/1987 | Harada et al. | 525/328.2 |
| 4,839,461 | 6/1989 | Boehmke | 528/363 |
| 5,041,291 | 8/1991 | Bader et al. | 424/426 |
| 5,175,285 | 12/1992 | Lehmann et al. | 544/141 |
| 5,288,783 | 2/1994 | Wood | 525/418 |
| 5,296,578 | 3/1994 | Koskan et al. | 528/363 |
| 5,516,758 | 5/1996 | Stevens et al. | 514/12 |
| 5,580,355 | 12/1996 | Groth et al. | 252/8.57 |
| 5,610,255 | 3/1997 | Groth et al. | 526/304 |

FOREIGN PATENT DOCUMENTS

| | | |
|---|---|---|
| 39 09 614 A1 | 9/1990 | Germany. |
| 1 404 814 | 9/1975 | United Kingdom. |
| WO 94/23004 | 10/1994 | WIPO. |

OTHER PUBLICATIONS

J. Org. Chem. 26 (1961) Chemical Studies of Polyaspartic Acids, pp. 1084–1091 No Month.

P. Neri in J. Med. Chem. 16 (1973) synthesis of α, β–Poly [(2–hydroxyethyl)–DL–aspartamide], a New Plasma Expander, pp. 893–897.

N. Peri et al., Macromol. Syntheses 8, pp. 25–28 (No Date).

Methoden der organischen Chemie [Methods of Organic Chemistry], (Houben–Wey), 4 Edition, vol. XIV/1, George Thieme Verlag, Stuttgart 1961, pp. 190–193 No Month.

*Primary Examiner*—Anthony Green
*Attorney, Agent, or Firm*—Sprung Kramer Schaefer & Briscoe

[57] ABSTRACT

Leather can be pretreated to obtain good body, soft feel, and excellent grain smoothness and solidity with products having a molecular weight of 700 to 30,000 and which are obtainable by reaction of A. polysuccinimide having a molecular weight, determined as the number-average, of 500 to 10,000, with B. 5 to 90 mol % based on the succinimide units of polysuccinimide A, and/or secondary amine, the nitrogen substituents of which contain 1 to 60 carbon atoms and which can be unsubstituted or substituted, at least 2.5 mol % of the nitrogen substituents of the amine containing at least 12 carbon atoms, C. optionally, (i) derivatives of $C_1$–$C_{18}$-monocarboxylic acids, $C_2$–$C_{10}$-dicarboxylic acids, and/or (ii) monoisocyanates, diisocyanates epichlorohydrin (for reaction of amino and/or hydroxyl groups on the nitrogen substituents of the reaction product of A and B), and D. 95 to 10 mol % of ring-opening base in the presence of water.

12 Claims, No Drawings

USE OF POLYASPARTIC ACID AMIDES AS LEATHER AUXILIARY PRODUCTS

The invention relates to the use of products which can be obtained by reaction of polysuccinimide with amine as leather auxiliaries. The use of these auxiliaries leads to desirable properties, such as a good body, soft feel and excellent grain smoothness and solidity of grain.

Leathers of little body are thin and hard and have a low flexibility. With the aid of leather auxiliaries, attempts are made to achieve the desired properties before, during and/or after tanning. It should be remembered here that, in spite of its softness, the leather should also have an adequate mechanical strength. Furthermore, the leather surface should not be tacky; it should have a pleasant feel. Some auxiliaries result in leathers which tend to have a loose grain; this undesirable concomitant phenomenon should also be avoided.

Surprisingly, it has now been found that polyaspartic acid amides have the excellent action described above on leather.

The invention thus relates to the use of products which have a molecular weight, determined as the number-average, of 700 to 30,000, preferably 1300 to 16,000, and are obtainable by reaction of A. polysuccinimide having a molecular weight, determined as the number-average, of 500 to 10,000, preferably 500 to 6000, in particular 1000 to 4000, with B. 5 to 90, preferably 20 to 80 mol %, based on the succinimide units of polysuccinimide A, of primary and/or secondary amine, the nitrogen substituents of which contain 1 to 60, preferably 1 to 36, carbon atoms and can be substituted by fluorine atoms, hydroxyl groups, amino groups and/or organosilicon radicals and/or interrupted by oxygen atoms, ester groups, amides groups, urea groups or urethane groups, at least 2.5, preferably at least 15, in particular at least 30 mol % of the nitrogen substituents of the amine containing at least 12 carbon atoms, if appropriate C. (i) derivatives of $C_1$–$C_{18}$-monocarboxylic acids and/or $C_2$–$C_{10}$-dicarboxylic acids and/or (ii) monoisocyanates, diisocyanates or epichlorohydrin (for reaction of amino and/or hydroxyl groups on the nitrogen substituents of the reaction product of A and B), and (necessarily)

D. 95 to 10, preferably 80 to 20 mol % of ring-opening base in the presence of water, as leather auxiliaries.

The polysuccinimide A used as the starting substance for the polyaspartic acid amides to be used according to the invention is known. It can thus be prepared from aspartic acid water being split off; cf., for example, J. Org. Chem. 26 (1961) 1084; FR 70 24 831; P. Neri in J. Med. Chem. 16 (1973), 893; U.S. Pat. No. 4,363,797.

Other processes start from maleic acid or its anhydride and ammonia (German Offenlegungsschrift 4 305 368; and U.S. Pat. No. 4,839,461). Thus, for example, polysuccinimide can be prepared by reaction of 80 to 100 mol % of maleic acid and 20 to 0 mol % of succinic anhydride (as a chain stopper) with ammonia at elevated temperature, in general at 85° to 240°, preferably 120° to 180° C., the water of reaction being removed.

U.S. Pat. No. 4,839,461 (=EP-A 256 366) describes the preparation from maleic anhydride, water and ammonia. According to this process, maleic anhydride is converted into the monoammonium salt in an aqueous medium with the addition of concentrated ammonia solution. This maleic acid monoammonium salt can be subjected to a thermal, optionally continuous polycondensation, preferably at 150° to 180° C. in a reactor over a residence time of 5 to 300 minutes, to give polysuccinimide.

The polysuccinimide A used as the starting compound can also be prepared by dehydration of polyaspartic acid.

The preparation of polyaspartic acid and its derivatives has been the subject matter of numerous publications for a long time. The preparation can thus be carried out by thermal polycondensation of aspartic acid (J. Org. Chem. 26, 1084 (1961); cf. also German Offenlegungsschrift 2 253 190 and U.S. Pat. Nos. 4,696,981, 5,296,578 and 5,288,783.

In a preferred embodiment, polyaspartic acid essentially contains recurring units of the following structures

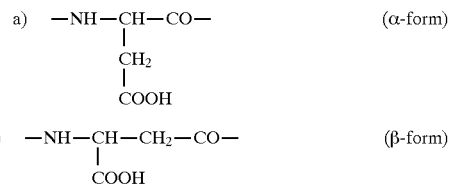

In general, the proportion of the β-form is more than 50%, in particular more than 70%, based on the sum of a+b.

In addition to the recurring aspartic acid units a) and b), it can contain further recurring units, for example c) malic acid units of the formula

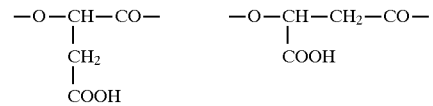

d) maleic acid units of the formula

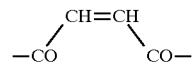

e) fumaric acid units of the formula

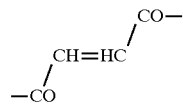

The polyaspartic acid can contain the "further" recurring units in amounts of up to 100% by weight, based on the sum of a+b.

Preferred polyaspartic acids have molecular weights, determined as the weight-average by gel permeation chromatography (calibrated with polystyrene), of 500 to 10,000, preferably 1000 to 5000, in particular 2000 to 4000.

The dehydration of polyaspartic acid to give polysuccinimide can be carried out at elevated temperature, preferably at 100° to 240° C., if appropriate in the presence of a catalyst, for example in the presence of 0.01 to 1% by weight, based on the polyaspartic acid, of an acid catalyst, such as sulphuric acid, phosphoric acid or methanesulphonic acid.

Preferred amines B include secondary and—preferably—primary amines, such as, for example, monofunctional polyether-amines with a primary or secondary amino group, such as α-methyl-ω-amino-polyoxyethylene, α-methyl-ω-aminopropyl-triethoxysilane, aminopropyl-trimethoxysilane, aminopropyl-heptamethyl-trisiloxane, N-2-aminoethyl-aminopropyl-dimethyl-ethoxy-silane, N-2-aminoethyl-aminopropyl-methyl-dimethoxy-silane, perfluorohexyl-ethylamine, N-aminoethyl-N-methyl-perfluorooctylsulphonamide, N,N-dimethylethylenediamine, methylamine, diethylamine, butylamine, stearylamine, tallow fatty amine, oleylamine, undecylamine, dodecylamine, octylamine, hexylamine, eicosanylamine, hexadecylamine, 2-ethyl-hexylamine, morpholine, ethanolamine, diethanolamine, bis-2-hydroxy-propylamine, bis-3-hydroxy-propylamine, 2- or 3-hydroxypropylamine, ethoxy-ethylamine, ethoxy-ethoxy-ethylamine, butoxy-ethoxy-ethoxy-ethylamine, 2-methoxy-ethyl-amine, tetrahydrofurfurylamine, 5-aminopentanol, benzylamine, 4-aminocyclohexylamine, taurine Na salt, glycine methyl ester, N-methylaminoethyl-sulphonic acid Na salt, dehydroabiethylamine, stearoyloxypropylamine,

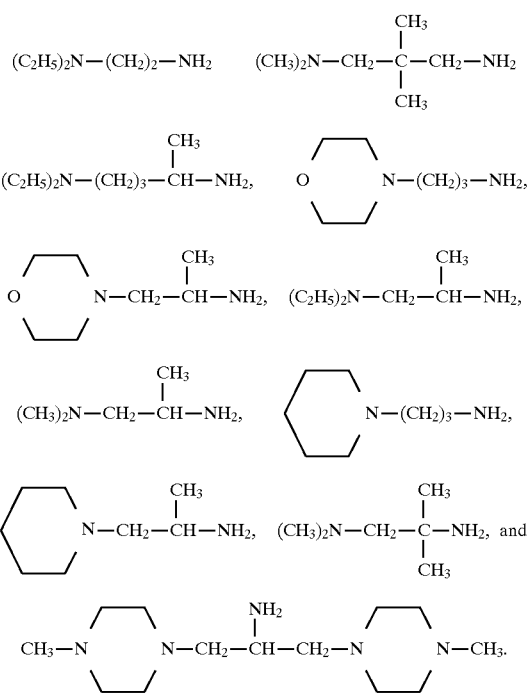

The reaction of polysuccinimide with amines is known in principle; cf., for example, German Offenlegungsschrift 2 253 190, EP-A 274 127, 406 623 and 519 119, U.S. Pat. Nos. 3,846,380, 3,927,204 and 4,363,797; and P. Neri et al., Macromol. Syntheses 8, 25. Although the reaction can be carried out in excess amine B, it is preferably carried out in organic solvents which are inert under the reaction conditions. Suitable such solvents are, for example, lactams, such as caprolactam, N-methylpyrrolidone and N-methylcaprolactam, polyalkylene diols and mono- and diethers thereof, such as ethylene glycol, diethylene glycol, triethylene glycol, ethylene glycol dimethyl and diethyl ether and diethylene glycol monoethyl ether, as well as dimethylformamide and dimethylsulphoxide. The solvent content will as a rule not exceed 30% by weight, based on the total reaction mixture.

The reaction mixture can comprise water or paraffins, although this is not preferred. The reaction is carried out in a temperature range from 20° to 160° C., the reaction times being between 2 and 72 hours. The product can be isolated by removal of the solvent by distillation or by precipitation of the product in a non-solvent, such as acetone, methanol, ethanol, water or isopropanol, and, if desired, subsequently dried.

The polyaspartic acid amides to be used according to the invention can be prepared from the reaction product of A and B by opening the remaining incorporated succinimide rings. Possible ring-opening bases D are both alkali metal hydroxides, carbonates and bicarbonates, in particular sodium hydroxide and potassium hydroxide and sodium carbonate, and ammonia and amines - including the amines B.

According to a particular embodiment, maleic acid or maleic anhydride and aqueous ammonia can be mixed in a molar ratio of 1:0.75 to 1:1.5 and water can be distilled off. When the polysuccinimide has reached the desired molecular weight, if appropriate co-using an organic solvent, such as diethylene glycol, pyrrolidone or N-methylpyrrolidone, amine B is metered in and reacted at 130° to 160° C. A reaction time of 3 to 18, preferably 4 to 8 hours, is as a rule sufficient for the reaction with amine B. If appropriate, an organic solvent can be added. The polyaspartic acid amide to be used according to the invention is formed directly, and can easily be dispersed in water with simultaneous opening of the remaining incorporated succinimide rings with ring-opening base D, the co-use of customary dispersing agents being advantageous.

In an idealized form, the polyaspartic acid amides to be used according to the invention contain recurring structural units of the formulae (A)  (I)

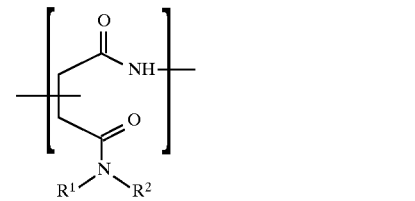

or mixtures thereof with various substituents $R^1$ and $R^2$ (B)      (C)      (II)

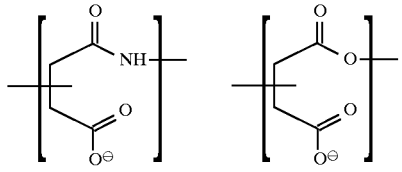

(D)  (III)

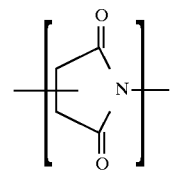

wherein $R^1$ and $R^2$ denote hydrogen or one of the radicals designated above as nitrogen substituents, with the proviso that at least one of the two radicals is other than hydrogen, and $M^+$ represents $H^+$ or an alkali metal ion, an $NH_4$ ion or a primary, secondary or tertiary aliphatic ammonium radical, which preferably carries at least one $C_1$–$C_{22}$-alkyl or -hydroxyalkyl group.

Suitable radicals $M^+$ are, for example, hydroxyethylammonium, dihydroxyethylammonium, trishydroxyethylammonium, triethylammonium, ammonium butylammonium, benzyltrimethylammonium, morpholinium, stearylammonium and oleylammonium.

The polymer preferably contains the structural units I in an amount of 5 to 90, in particular 20 to 80 mol %, based on all the recurring units. Preferred polyaspartic acid amides contain on average at least one $C_{12}$–$C_{24}$-alkyl and/or -alkylene radical per structural unit I.

The polymer preferably contains the structural units II in an amount of 95 to 10, in particular 80 to 20 mol %, based on all the recurring units. Polyaspartic acid amides in which the carboxyl groups are present in partly neutralized form are particularly preferred. The preferred degree of neutralization is 10 to 70, preferably 20 to 50%. 0 to 20 mol % is the structure IIC based on the structures II.

The polymer contains the structural units III in an amount of 0 to 5 mol %, based on all the recurring units. Preferred polyaspartic acid amides contain less than 1 mol % of the structural units III.

In the case where polysuccinimide A has been prepared from polyaspartic acid which contains the abovementioned recurring units C), the carboxyl groups of these recurring units can also be amidated.

Suitable nitrogen substituents $R^1$ and $R^2$ include, independently of one another, for example, optionally hydroxyl-substituted $C_1$–$C_{22}$-alkyl or $C_2$–$C_{22}$-alkenyl groups from hydroxyethyl, hydroxypropyl, methyl, ethyl, butyl, hexyl, octyl, octenyl, decyl, undecyl, undecenyl, dodecyl, tetradecyl, hexadecyl, oleyl, octadecyl and 12-hydroxy-octadecenyl, $C_5$–$C_{10}$-cycloalkyl radicals, such as cyclohexyl, $C_{12}$–$C_{30}$-radicals interrupted by oxygen atoms, ester groups, amide groups or urethane groups, such as stearyloxyethyl, stearyloxyethoxyethyl and stearylcarbamoyloxyethyl, and radicals of the formulae

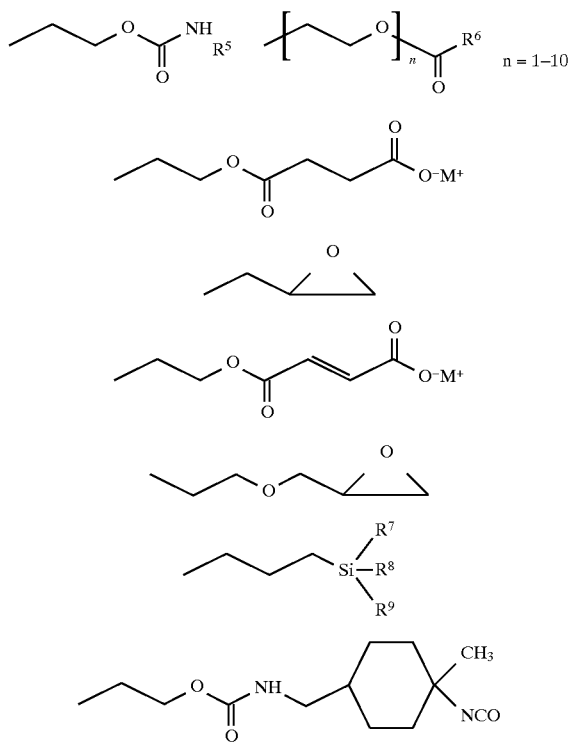

wherein
$R^6$ and $R^6$ denote $C_1$–$C_{30}$-alkyl, $C_2$–$C_{30}$-alkenyl or $C_5$–$C_{10}$-cycloalkenyl,
$R^7$ to $R^9$ denote $C_1$–$C_4$-alkyl or -alkoxy and
$M^+$ has the abovementioned meaning.

Nitrogen substituents which are interrupted by oxygen atoms, ester groups, amide groups or urethane groups can in principle be formed either by using amines B already containing these groups or subsequently by reaction of initially introduced reactive nitrogen substituents with suitable reaction partners.

Amide and ester groups can be introduced, for example, by subsequent conversion of already introduced aminoalkyl or hydroxyalkyl radicals by reaction with reactive carboxylic acid derivatives, preferably with derivatives of $C_1$–$C_{18}$-monocarboxylic acids or $C_2$–$C_{10}$-dicarboxylic acids, such as anhydrides or chlorides, for example acetic anhydride, acetylchloride, acryl and methacrylchloride, methacrylic anhydride, succinic anhydride, maleic anhydride, stearyl chloride or phthalic anhydride.

Urethane groups and urea groups can be introduced, for example, by subsequent reaction of already introduced amino or hydroxyalkyl radicals with mono- or diisocyanates, such as butyl isocyanate, stearyl isocyanate, toluylene diisocyanate, isophorone diisocyanate or 1-isocyanatomethyl-4-methyl-4-cyclohexyl isocyanate. Monoisocyanates are particularly preferred. Crosslinked products are not preferred.

Nitrogen substituents interrupted by oxygen atoms are preferably introduced by using corresponding amino ethers B.

Epoxide groups can be introduced, for example, by subsequent epoxidation of already introduced alkenyl groups, for example with peracids. Another possibility is alkylation with epichlorohydrin.

The polyaspartic acid amides to be used according to the invention are very often self-dispersing, especially if the proportion of structural units I is less than 50 mol %. However, external dispersing agents can also be used; possible such agents are in principle cationic, anionic and nonionic dispersing agents, such as are described, for example, in "Methoden der organischen Chemie" [Methods of Organic Chemistry] (Houben-Weyl), 4th Edition, Volume XIV/1, George Thieme Verlag, Stuttgart 1961, page 190 et seq.

Preferred dispersing agents include, for example, $C_8$–$C_{18}$-n-alkyl sulphates, $C_8$–$C_{18}$-n-alkyl-benezenesulphonates, $C_8$–$C_{18}$-n-alkyl-trimethyl-ammonium salts, n-di-$C_8$–$C_{18}$-alkyl-dimethyl-ammonium salts, $C_8$–$C_{18}$-n-alkyl carboxylates, $C_8$–$C_{18}$-n-alkyl-dimethylamine oxides, $C_8$–$C_{18}$-n-alkyl-dimethylphosphine oxides and—preferably—oligoethylene glycol mono-$C_6$–$C_{18}$-alkyl ethers having on average 2 to 30 ethoxy groups per molecule. Some of the n-alkyl radicals can also be replaced by unsaturated linear aliphatic radicals. Particularly preferred dispersing agents are oligoethylene glycol mono-$C_{10}$–$C_{14}$-alkyl ethers having on average 4 to 12 ethoxy groups per molecule, in particular oligoethylene glycol mono-$C_{12}$-alkyl ethers having on average 8 ethoxy groups per molecule.

Preferred dispersing agents furthermore include oleic acid, oleic acid sarcosides, ricinoleic acid, stearic acid, fatty acid partial esters of polyols, such as glycerol, trimethylolpropane or pentaerythritol, and acylation, ethoxylation and propoxylation products thereof, for example glycerol monostearate and monooleate, sorbitan monostearate and monooleate, sorbitan tristearate and trioleate and reaction products thereof with dicarboxylic acid anhydrides, such as succinic anhydride, maleic anhydride, phthalic anhydride or tetrahydrophthalic anhydride, and reaction products of bis-(hydroxymethyl)-tricyclodecane and maleic anhydride or succinic anhydride and derivatives thereof, preferably in the form of their alkali metal or ammonium salts.

Particularly preferred dispersing agents are salts from long-chain fatty acids, preferably oleic acid, and an aminoalcohol, preferably hydroxyethylamine, bishydroxyethylamine or trishydroxyethylamine.

The dispersion of the polyaspartic acid amides to be used according to the invention can be formed by dispersing the polyaspartic acid amides in an aqueous dispersing agent solution, preferably with heating to temperatures of 40° to 95° C. while stirring.

In general, it is advisable to disperse the polyaspartic acid amides to be used according to the invention directly from the reaction mixture, which contains organic solvent, if appropriate, without intermediate isolation. Thus, for example, an aqueous dispersing agent solution can be metered into the reaction mixture at temperatures of 70° to 130° C., while stirring, so that a mixing temperature of 70° to 95° C. is established, and the organic solvent can be distilled off. Conversely, it is of course also possible for the reaction mixture to be dispersed in the aqueous dispersing agent solution or a mixture of the reaction mixture and dispersing agent to be dispersed in water. The removal of the solvent can also be omitted; in this case, however, the solvent content of the dispersion should not exceed 10% by weight.

The dispersing agent content is in general not more than 30, preferably 3 to 15% by weight based on the finished dispersion.

The solids content of the dispersions can be 5 to 70% by weight. The average particle size of the dispersed polyaspartic acid amides is in general 100 to 1000, preferably 100 to 700, and in particular 100 to 400 nm.

To facilitate penetration of the auxiliaries into the leather, it may be desirable to reduce the particle size of the disperse phase. For this, the pre-emulsion already obtained can be after-treated under a high shear gradient in known dispersing machines, such as in a jet disperser or mixers with the rotor-stator principle. The duration of the dispersing can be a few minutes up to 4 hours. The dispersing is preferably carried out in a temperature range between 20° and 75° C.

The dispersions can be present in the form of pastes, especially at solids contents above 40% by weight, but these can be readily diluted with water. The dispersions having a solids content below 40% by weight are present in the form of thinly liquid emulsions. The pH of the emulsions or pastes is between 4.5 and 12, preferably in the pH range between 4.5 and 10.

The leather treatment can be carried out with an aqueous liquor which comprises the polyaspartic acid anhydrides to be used according to the invention.

For this, the leather is brought into contact with the liquor by application by means of rolls or in a tank, preferably in a tanning drum. After the treatment, the leather is dried.

The individual process steps are to be illustrated by the example of wet blue (chrome-tanned hides):

1. Neutralization of the chrome-tanned leather
2. Washing
3. Addition of the liquor comprising the polyaspartic acid amides to be used according to the invention
4. Reduction of the pH to pH values of <4.5, preferably to 3.0 to 4.5, by addition of carboxylic acid
5. Washing
6. Drying.

In a particular embodiment, leather can also be treated subsequently with a dispersion which comprises the polyaspartic acid amides to be used according to the invention.

Other auxiliaries can be co-used in the liquor which comprises the agents to be used according to the invention, or separately from this. These auxiliaries include: polymeric retanning substances based on known polyacrylate dispersions, leather dyestuffs, vegetable tannins, syntans, fat-liquoring agents, neutral oils and hydrophobizing agents. Only those combinations which are compatible with the dispersions of the polyaspartic acid according to the invention can be used. The use of additives having an anionic charge as a rule presents no problems at a liquor pH of 6 to 4.5. However, these additives can also be employed particularly advantageously before or after the use of the polyaspartic acid amides to be used according to the invention.

Suitable fat-liquoring agents are, for example:

oxidized and/or sulphoxidized, preferably halogen-free $C_{16-30}$-hydrocarbons and/or $C_{32-100}$-waxes, $C_{2-54}$-polycarboxylic acids partly esterified with $C_{8-30}$-alcohols, such as citric acid octadecyl ester and glutaric acid monooleate, $C_{2-54}$-polyols which are at least partly esterified with $C_{12-24}$-fatty acids, such as sorbitan, glycerol, trimethylolpropane and pentaerythritol monostearate, monooleate, distearate, dioleate, monolaurate and the like.

Suitable syntans are, for example, the synthetic organic tannins known to the expert (cf. K. Faber, "Gerbmittel, Gerbung und Nachgerbung" [Tanning agents, tanning and retanning], Frankfurt 1984).

Suitable vegetable tannins are, for example, chestnut extracts, mimosa and the like.

Fat liquoring plays an important role in the hydrophobizing action. Reference may be made to the literature in this context (cf. M. Hollstein "Entfetten, Fetten und Hydrophobieren bei der Lederherstellung" [Degreasing, fat liquoring and hydrophobizing in leather production], Frankfurt, 1988; Ullmann's Encyclopädie der technischen Chemie [Ullmann's Encyclopedia of Industrial Chemistry, keyword leather].

Suitable neutral oils are, for example, animal and/or vegetable fats and oils, such as neat's foot oil, fish oil, sunflower oil, rape oil, coconut oil, palm kernel oil and soya oil, preferably non-halogenated fatty acid esters, oleic acid methyl ester, paraffin oil and tallow. Suitable hydrophobizing agents are silicone emulsions and polymer dispersions containing perfluoroalkyl groups, including polyurethanes containing perfluoroalkyl groups.

The polyaspartic acid amides to be used according to the invention also produce a soft and full feel without further auxiliaries of the abovementioned categories. To fix the polyaspartic acid amides to be used according to the invention, it is sufficient to reduce the pH by addition of a carboxylic acid. The liquor exhaustion is as a rule so good that it is also possible to add the acid to the drum without draining off the liquor. Preferred pH values should be less than 4.5 in order to achieve adequate fixing in the leather. The range between 3.0 and 4.5 is particularly preferred.

Instead of fixing with a carboxylic acid, fixing can also be carried out in the liquor by addition of polyvalent metal compounds, such as salts or carboxylates or alkoxides of aluminium, titanium, zirconium or chromium. For ecological reasons, however, this is generally omitted.

To achieve an adequate action, according to the invention up to 10% by weight, preferably up to 7% by weight, of active substance, based on the shaped weight, is employed. The pH of the liquor at the start of the treatment is preferably 5 to 7. If appropriate, the pH can be corrected by addition of bases, such as ammonia. The treatment is carried out at a temperature between 20 and 80° C., preferably between 35 and 60° C. After the treatment, a pH of about 4 to 6 is established in the liquor. The pH is reduced to 3 to 4.5 by addition of a carboxylic acid. The preferred carboxylic acid for the acidification is formic acid.

The use according to the invention of the polyaspartic acid amides gives leather having good hydrophobic properties.

If the hydrophobic action requirements are relatively high, it is possible to carry out a concluding hydrophobization with silicone active compounds or fluorocarbon resins. These active compounds are known to the expert and can be metered into the same drum after a running time of the liquor of preferably 30 minutes. The active compounds, which are usually anionic, are readily compatible with the dispersions of the polyaspartic acid amides to be used according to the invention.

Percentage data of the following examples in each case relate to the weight, unless stated otherwise; parts are parts by weight.

Preparation Examples

Preparation of the active compound with intermediate isolation

Example A 1

38.8 g of polysuccinimide having an average molecular weight of 3000 are dissolved in 374 g of dimethylformamide and the solution is heated to 100°–110° C. with 86 g of stearylamine (0.80 mol/mol of imide). The mixture is stirred at this temperature for 5 hours. It is then cooled to room temperature. The reaction mixture is poured into excess (1500 ml) methanol, the reaction product precipitating out in finely divided form. The product is filtered off over a suction filter and washed with methanol and dried. A pale powder is obtained.

Example A 2

289 g of polysuccinimide having an average molecular weight of 3000 are dissolved in 1150 g of dimethylformamide and the solution is heated to 110° C. with 400 g of stearylamine (0.5 mol/mol of imide). The mixture is stirred at this temperature for 6 hours. It is then cooled to room temperature. The reaction mixture is poured into excess (6000 ml) methanol, the reaction product precipitating out in finely divided form. The product is filtered off over a suction filter and washed with methanol and dried. A pale powder is obtained.

Example A 3

50 g of polysuccinimide having an average molecular weight of 6000 are dissolved in 250 g of dimethylformamide and the solution is heated to 110°–120° C. with 110.8 g of stearylamine (0.80 mol/mol of imide). The mixture is stirred at this temperature for 5 hours. It is then cooled to room temperature. The reaction mixture is poured into excess (2200 ml) methanol, the reaction product precipitating out in finely divided form. The product is filtered off over a suction filter and washed with methanol and dried. A pale powder is obtained.

Example A 4

50 g of polysuccinimide having an average molecular weight of 3000 are dissolved in 200 g of dimethylformamide and the solution is heated to 120° C. with 43 g of stearylamine (0.31 mol/mol of imide). The mixture is stirred at this temperature for 6 hours. It is then cooled to room temperature. The reaction mixture is poured into excess (1000 ml) methanol, the reaction product precipitating out in finely divided form. The product is filtered off over a suction filter and washed with methanol and dried. A pale powder is obtained.

Preparation of active compound without intermediate isolation

Example B 1

48.5 g of polysuccinimide having an average molecular weight of 3000 are dissolved in 40 g of N-methylpyrrolidone and the solution is heated to 140° C. with 67.3 g of stearylamine (0.5 mol/mol of imide). The mixture is stirred at this temperature for 6 hours. The resulting reaction mixture is further processed directly. If required, the product can be comminuted after cooling to room temperature.

Example B 2

48.5 g of polysuccinimide having an average molecular weight of 3000 are dissolved in 30 g of caprolactarn and the solution is heated to 140° C. with 67.3 g of stearylamine (0.5 mol/mol of imide). The mixture is stirred at this temperature for 6 hours. The resulting reaction mixture is further processed directly. If required, the product can be comminuted after cooling to room temperature.

Example B 3

48.5 g of polysuccinimide having an average molecular weight of 3000 are dissolved in 40 g of N-methylpyrrolidone and the solution is heated to 135°–145° C. with 74.85 g of stearylamine and 9.15 g of ethanolamine (0.86 mol of amines/mol of imide). The mixture is stirred at this temperature for 6 hours. The resulting reaction mixture is further processed directly. If required, the product can be comminuted after cooling to room temperature.

Example B 4

48.5 g of polysuccinimide having an average molecular weight of 3000 are dissolved in 40 g of N-methylpyrrolidone and the solution is heated to 135°–145° C. with 74.85 g of stearylamine, 6.1 g of ethanolamine and 5.1 g of N,N-dimethylaminopropylamine (0.86 mol of amines/mol of imide). The mixture is stirred at this temperature for 6 hours. The resulting reaction mixture is further processed directly. If required, the product can be comminuted after cooling to room temperature.

Example B 5

32.3 g of polysuccinimide having an average molecular weight of 3000 are dissolved in 26.7 g of N-methylpyrrolidone and the solution is heated to 140° C. with 44.6 g of oleylamine, (0.50 mol/mol of imide). The mixture is stirred at this temperature for 6 hours. The resulting reaction mixture is further processed directly. If required, the product can be comminuted after cooling to room temperature.

Example B 6

146 g of polysuccinimide having an average molecular weight of 3000 are dissolved in 90 g of N-methylpyrrolidone and the solution is heated to 130°–155° C. with 201.7 g of stearylamine, (0.50 mol/mol of imide). The mixture is stirred at this temperature for 8 hours. The resulting reaction mixture is further processed directly. If required, the product can be comminuted after cooling to room temperature.
Preparation of the dispersions from polyaspartic acid amides A1 to A4 (without an organic solvent)

Dispersion C 1

29.0 g of the product from Example A 1 are added to a solution which has been heated to 75° C. and comprises 3.25 g of oleic acid, 1.97 g of monoethanolamine and 307.9 g of water. The dispersion is homogenized at 75° C. for 30 minutes. The particle size of the disperse phase in the dispersion obtained by this procedure can be reduced by a jet disperser if it is not yet satisfactory. The particle size is then less than 500 nm. The dispersion is adjusted to a solids content of 10% by weight.

Dispersion C 2

246.0 g of the product from Example A 2 are added to a solution which has been heated to 70° C. and comprises 24.6 g of oleic acid, 10.5 g of monoethanolamine and 1124.4 g of water. The dispersion is homogenized at 70° C. for 30 minutes. The dispersion obtained by this procedure can be adjusted in its particle size by a jet disperser if it is not yet satisfactory. The particle size is then 227 nm. The dispersion is adjusted to a solids content of 20% by weight.

Dispersion C 3

14.5 g of the product from Example A 3 are added to a solution which has been heated to 70° C. and comprises 1.6 g of oleic acid, 0.98 g of monoethanolamine and 153.9 g of water. The dispersion is homogenized at 70° C. for 30 minutes. The particle size is less than 500 nm. The dispersion is adjusted to a solids content of 10% by weight.

Dispersion C 4

20.0 g of the product from Example A 4 are added to a solution which has been heated to 70° C. and comprises 7.09 g of oleic acid, 0.86 g of monoethanolamine and 91.4 g of water. The dispersion is homogenized at 70° C. for 30 minutes. The particle size is less than 400 nm. The dispersion is adjusted to a solids content of 20% by weight.
Preparation of the dispersions from polyaspartic acid amides B1 to B6 (with an organic solvent)

Dispersion D 1

50 g of the product from Example B 1 (corresponding to 37.17 g of active compound) are initially introduced into the preparation vessel at 110° C. A solution of 3.7 g of oleic acid and 1.6 g of monoethanolamine in 156.9 g of water is added dropwise at this temperature. After addition of the total amount, the mixture is first homogenized at 90° C. in the course of 30 minutes. The dispersion obtained by this procedure can be adjusted in its particle size by a jet disperser if it still contains coarse particles. Even without this dispersing technique, the emulsion has a particle size<500 nm. The dispersion is adjusted to a solids content of 20% by weight.

Dispersion D 2

50 g of the product from Example B 2 (corresponding to 39.71 g of active compound) are initially introduced into the preparation vessel at 110° C. A solution of 3.97 g of oleic acid and 1.69 g of monoethanolamine in 172.6 g of water is added dropwise at this temperature. After addition of the total amount, the mixture is first homogenized at 70° C. in the course of 60 minutes. The dispersion obtained by this procedure can be adjusted in its particle size by a jet disperser if it still contains coarse particles. Even without this dispersing technique, the emulsion has a particle size<500 nm. The dispersion is adjusted to a solids content of 20% by weight.

Dispersion D 3

50 g of the product from Example B 3 (corresponding to 38.41 g of active compound) are initially introduced into the preparation vessel at 110° C. A solution of 3.7 g of oleic acid and 1.70 g of monoethanolamine in 242.7 g of water is added dropwise at this temperature. After addition of the total amount, the mixture is first homogenized at 80° C. in the course of 240 minutes. The dispersion obtained by this procedure can be adjusted in its particle size by a jet disperser if it still contains coarse particles. Even without this dispersing technique, the emulsion has a particle size<500 nm. The dispersion is adjusted to a solids content of 14.7% by weight.

Dispersion D 4

50 g of the product from Example B 4 (corresponding to 38.54 g of active compound) are initially introduced into the preparation vessel at 110° C. A solution of 3.7 g of oleic acid and 1.70 g of monoethanolamine in 242.7 g of water is added dropwise at this temperature. After addition of the total amount, the mixture is first homogenized at 80° C. in the course of 120 minutes. The dispersion obtained by this procedure can be adjusted in its particle size by a jet disperser if it still contains coarse particles. Even without this dispersing technique, the emulsion has a particle size<500 nm. The dispersion is adjusted to a solids content of 14.7% by weight.

Dispersion D 5

50 g of the product from Example B 5 (corresponding to 37.12 g of active compound) are initially introduced into the preparation vessel at 110° C. A solution of 3.7 g of oleic acid and 1.6 g of monoethanolamine in 156.9 g of water is added dropwise at this temperature. After addition of the total amount, the mixture is first homogenized at 70° C. in the course of 180 minutes. The dispersion obtained by this procedure can be adjusted in its particle size by a jet disperser if it still contains coarse particles. Even without this dispersing technique, the emulsion has a particle size<500 nm. The dispersion is adjusted to a solids content of 20% by weight.

Dispersion D 6

50 g of the product from Example B 6 (corresponding to 39.71 g of active compound) are initially introduced into the preparation vessel at 110° C. A solution of 5.2 g of monoethanolamine in 169.3 g of water (without oleic acid) is added dropwise at this temperature. After addition of the total amount, the mixture is first homogenized at 80°–90° C. in the course of 180 minutes. The dispersion obtained by this procedure can be adjusted in its particle size by a jet disperser if it still contains coarse particles. Even without this dispersing technique, the emulsion has a particle size 347 nm. The dispersion is adjusted to a solids content of 20% by weight.

Dispersion D 7

10 g of the product from Example B 1 (corresponding to 7.43 g of active compound) are initially introduced into the preparation vessel at 110° C. A solution of 0.74 g of an emulsifier which has been obtained by reacting 1 mol of trimethanolpropane monostearate with 2 mol of succinic anhydride in bulk and 0.32 g of monoethanolamine in 31.4 g of water is added dropwise at this temperature. After addition of the total amount, the mixture is initially homogenized at 70° C. in the course of 180 minutes. The dispersion obtained by this procedure can be adjusted in its particle size by a jet disperser if it still contains coarse particles. Even without this dispersing technique, the emulsion has a particle size<500 nm. The dispersion is adjusted to a solids content of 20% by weight.

Dispersion D 8

10 g of the product from Example B 1 (corresponding to 7.43 g of active compound) are initially introduced into the preparation vessel at 110° C. A solution of 0.74 g of an emulsifier which has been obtained by reacting 1 mol of glycerol monostearate with 2 mol of succinic anhydride in bulk and 0.32 g of monoethanolamine in 31.4 g of water is added dropwise at this temperature. After addition of the total amount, the mixture is initially homogenized at 70° C. in the course of 180 minutes. The dispersion obtained by this procedure can be adjusted in its particle size by a jet disperser if it still contains coarse particles. Even without this dispersing technique, the emulsion has a particle size<500 nm. The dispersion is adjusted to a solids content of 20% by weight.

Use Examples: leather treatment

The following auxiliaries, inter alia, were employed:

®TANIGAN PAK-N: light-fast anionic retanning substance with a neutralizing and buffer action, condensation product of aromatic sulphonic acids. pH 6.6, concentration about 95%, product of Bayer AG, Leverkusen ®TANIGAN QF: Synthetic replacement tannin for aftertreatment of chrome leather, pH 5.3, acid number 0 to 5, concentration about 96%, product of Bayer AG, Leverkusen ®CROMOSAL B: Basic chrome tannin having a $Cr_2O_3$ content of 26%.

The dispersions from Examples C and D were tested as leather auxiliaries. The following recipe is suitable for upper leather.

Material: chrome-tanned cow wet blue, grain leather, contains 2.5% of $Cr_2O_3$

Shaped thickness: 2 mm

The following percentage data are based on the shaped weight. The amounts of the auxiliaries employed in the following recipe are based on the active compound available.

| | | |
|---|---|---|
| Neutralization | 50% water, 40° C. | |
| | +2% ®TANIGAN PAK-N | 45 minutes |
| | +0.5% sodium bicarbonate | |
| | pH of the liquor at the end: 5.1 to 5.3 | |
| | drain off liquor | |
| Dyeing | 100% water, 50° C. | |
| | +1% ®BAYGENAL Braun CGG | 20 minutes |
| Retanning | +4% ®TANIGAN QF | 150 minutes |
| | Replacement tannin (pH about 5.3) | |
| | +8% chestnut, sweet | |
| | pH of the liquor at the end: 4.3 to 4.4 | |
| | drain off the liquor | |
| Washing | 200% water, 50° C. | 10 minutes |
| | drain off the liquor | |
| Hydrophobization | 100% water, 50° C. | |
| | +0.5% $NH_4OH$ | 20 minutes |
| | +6.5% dry substance | 60 minutes |
| | product according to the invention | |
| | from Example C 4 | |
| | pH of the liquor at the end: 4.9 to 5.0 | |
| | drain off the liquor | |
| Fixing | 50% water, 30° C. | |
| | for a) +0.5% HCOOH (in 2 portions) | a 10 min. |
| | for b) +2.5% ®CHROMOSAL B | 60 minutes |
| | pH of the liquor at the end 3.9 | |
| | drain off the liquor (clear and colourless). | |

Rinse, lay the leather on a buck overnight, sammy. Vacuum drying (10 minutes at 70° C.), condition in air, stake.

Soft solid-grain leathers with a pleasantly full feel were obtained. The grain side was very smooth. The uptake of water by the leather produced by the process described above was less than 60% after 24 hours. In a Maeser penetrometer, more than 1000 folds were achieved before water penetrated.

Further use examples are shown in Table 1. A simplified procedure was chosen here, the working steps of dyeing and retanning being omitted in order to detect possible discolorations. For better differentiation of the products according to Examples C and D. the use of only 2.5% of active compound was chosen. By using amounts of 6.5%, water uptake values of less than 60% can be established, as the recipe described above shows by way of example.

TABLE 1

Properties of the leathers

| Dispersion according to Example No. | Feel rating* | Grain smoothness rating** |
|---|---|---|
| C1 | 2 | 1 |
| C2 | 1 | 1 |
| C3 | 3 | 1 |
| C4 | 1 | 1 |
| D1 | 2 | 1 |
| D2 | 2 | 1 |
| D3 | 2 | 2 |
| D4 | 2 | 2 |
| D5 | 1 | 2 |
| D6 | 2 | 1 |
| D7 | 2 | 1 |
| D8 | 2 | 1 |
| Comparison (Lubritan WP+) | 3 | 2 |

*Rating 1 = soft, rating 5 = hard
**Rating 1 = smooth, rating 5 = rough
+Commercial product of Rohm & Haas, testing likewise according to the use instructions given above.

We claim:

1. A method for treating leather comprising treating leather with leather auxiliary products having a molecular weight, determined as the number-average, of 700 to 30,000 prepared by reaction of A. polysuccinimide having a molecular weight, determined as the number-average, of 500 to 10,000 and comprising succinimide units, with B. 5 to 90 mol %, based on the succinimide units of polysuccinimide A, of at least one primary or secondary amine, wherein the nitrogen of the amine is substituted with substituents containing 1 to 60 carbon atoms which can be unsubstituted or substituted by at least one of fluorine atoms, hydroxyl groups, amino groups, or organosilicon radicals, and which substituents can be uninterrupted or interrupted with at least one of ester groups, amides groups, urea groups, urethane groups, or oxygen atoms, at least 2.5 mol % of the substituents on the nitrogen of the amine containing at least 12 carbon atoms, C. optionally, at least one of (i) derivatives of $C_1$–$C_{18}$-monocarboxylic acids, or $C_2$–$C_{10}$-dicarboxylic acids, or at least one of (ii) monoisocyanates, diisocyanates or epichlorohydrin, and D. 95 to 10 mol %, based on the succinimide units, of ring-opening base in the presence of water.

2. A method according to claim 1, in which the leather auxiliary products have a molecular weight, determined as the number-average, of 1300 to 16,000.

3. A method according to claim 1, in which the amount of amine B ranges from 20 to 80 mol % and the amount of ring-opening base D ranges from 80 to 20 mol %.

4. A method according to claim 1, in which the nitrogen substituents of amine B have 1 to 30 carbon atoms.

5. A method according to claim 1, in which the leather is treated with an aqueous dispersion of the leather auxiliary products.

6. A method according to claim 5, in which the leather auxiliary products are fixed on the leather by using a pH of 3.2 to 4.5.

7. A method according to claim 5, in which the products are fixed on the leather by addition of compounds of chromium, aluminium, titanium or zirconium.

8. A method according to claim 1, in which the molecular weight of the polysuccinimide A is 500 to 6000.

9. A method according to claim 1, in which the molecular weight of the polysuccinimide A is 500 to 1000.

10. A method according to claim 1, in which the amount of said amine B is from 20 to 80 mol %.

11. A method according to claim 1, in which at least 15 mol % of the nitrogen substituents of amine B contains at least 12 carbon atoms.

12. Leathers which have been treated in accordance with the method of claim 1.

* * * * *

UNITED STATES PATENT AND TRADEMARK OFFICE
CERTIFICATE OF CORRECTION

PATENT NO. : 5,885,474
DATED : March 23, 1999
INVENTOR(S) : Reiners, et al.

It is certified that error appears in the above-identified patent and that said Letters Patent is hereby corrected as shown below:

Title Page            ABSTRACT: Line 8 after " polysuccinimide A. " insert -- of primary --

Col. 10, line 31     Delete " caprolactarn " and substitute -- caprolactam --

Col. 13, line 56     Delete " CROMOSAL B " and substitute -- CHROMOSAL B --

Col. 14, line 32     Delete " folds " and substitute -- flexes --

Signed and Sealed this

Fourteenth Day of September, 1999

Attest:

Q. TODD DICKINSON

*Attesting Officer*      *Acting Commissioner of Patents and Trademarks*